US012699383B2

(12) United States Patent
Gibson et al.

(10) Patent No.: US 12,699,383 B2
(45) Date of Patent: Aug. 4, 2026

(54) SYSTEMS AND METHODS FOR CONTROLLING PRODUCTION

(71) Applicant: A&E Engineering, Inc., Greer, SC (US)

(72) Inventors: Christopher Michael Gibson, Greer, SC (US); Lauren Challe Matthews, Meridian, ID (US)

(73) Assignee: A&E Engineering, Inc., Greer, SC (US)

( * ) Notice: Subject to any disclaimer, the term of this patent is extended or adjusted under 35 U.S.C. 154(b) by 753 days.

(21) Appl. No.: 18/072,346

(22) Filed: Nov. 30, 2022

(65) Prior Publication Data

US 2023/0168666 A1     Jun. 1, 2023

Related U.S. Application Data

(60) Provisional application No. 63/284,127, filed on Nov. 30, 2021.

(51) Int. Cl.
G05B 19/418        (2006.01)
(52) U.S. Cl.
CPC ................... G05B 19/4188 (2013.01); *G05B 2219/32335* (2013.01)
(58) Field of Classification Search
USPC ......................................................... 700/96
See application file for complete search history.

(56) References Cited

U.S. PATENT DOCUMENTS

| | | | |
|---|---|---|---|
| 2018/0088564 A1* | 3/2018 | Billi-Duran ...... | G05B 19/41865 |
| 2019/0219979 A1* | 7/2019 | Floeder ............... | G06F 9/30127 |
| 2019/0265687 A1* | 8/2019 | Pal .................... | G05B 19/41855 |
| 2020/0189898 A1* | 6/2020 | Theopold ........... | G05B 23/0235 |
| 2022/0284346 A1* | 9/2022 | Kanokogi .............. | G06N 20/00 |
| 2023/0075067 A1* | 3/2023 | Iyengar .................. | G06V 20/46 |
| 2023/0359178 A1* | 11/2023 | Delisle ............... | G05B 19/4183 |

* cited by examiner

*Primary Examiner* — Hien D Khuu
(74) *Attorney, Agent, or Firm* — Dority & Manning, P.A.

(57)        ABSTRACT

Example embodiments of the present disclosure provide for an example method for controlling the activity of a production facility, such as a production facility having one or more automation environments. The example method includes receiving data indicative of a current production environment. The data can include data of a sensor representing a time since last unit or fill level at one or more processing stations in a production facility. The example method can include determining an impact probability of a downtime event based at least in part on data indicative of the current production environment. The example method can include determining the impact probability of a downtime event and performing a control action associated with the production facility in response to determining the impact probability of the downtime event.

20 Claims, 8 Drawing Sheets

700

Receive Data Indicative of a Current Production Environment ⟋710

Determine an Impact Probability ⟋715

In Response to Determining the Impact Probability of the Downtime Event, Perform a Control Action Associated with the Production Facility ⟋720

SYSTEMS AND METHODS FOR CONTROLLING PRODUCTION

PRIORITY CLAIM

The present application claims priority to U.S. Provisional Patent Application No. 63/284,127 having a filing date of Nov. 30, 2021. Applicant claims priority to and the benefit of such application and incorporates such application herein by reference in its entirety.

FIELD

The present disclosure relates generally to improvements to computer-implemented systems and methods for controlling a production facility.

BACKGROUND

Production facilities are used for all kinds of purposes to manufacture products around the world. Production facilities often have multiple processing stations where units pass from one processing station to another as part of a production process. Downtimes at any one of these processing stations can lead to reduced productivity. Computer-implemented production tools can facilitate surfacing information related to such downtimes to users.

SUMMARY

Aspects and advantages of embodiments of the present disclosure will be set forth in part in the following description, or can be learned from the description, or can be learned through practice of the embodiments.

Example aspects of the present disclosure are directed to a computer-implemented method. The method can include receiving data indicative of a current production environment, wherein the data indicative of the current production environment comprises at least one of data from a sensor indicative of time since last unit and/or fill levels at one or more processing stations in a production facility. The method can include determining an impact probability, wherein the impact probability of a downtime event based at least in part on the data indicative of the current production environment. The method can include, in response to determining the impact probability of the downtime event, performing a control action associated with the production facility (e.g., providing a notification of the downtime, controlling automation equipment in response to the alert, accessing a machine-learned model and providing analytics associated with a future state, providing recommendations on production resources, etc.).

Other example aspects of the present disclosure are directed to systems, computing devices, non-transitory computer-readable media, and apparatus.

BRIEF DESCRIPTION OF THE DRAWINGS

Aspects of the disclosed technology are provided. Detailed descriptions of embodiments directed to one of ordinary skill in the art are set forth in the specification, which makes reference to the appended figures in which.

DETAILED DESCRIPTION

Figure 1:
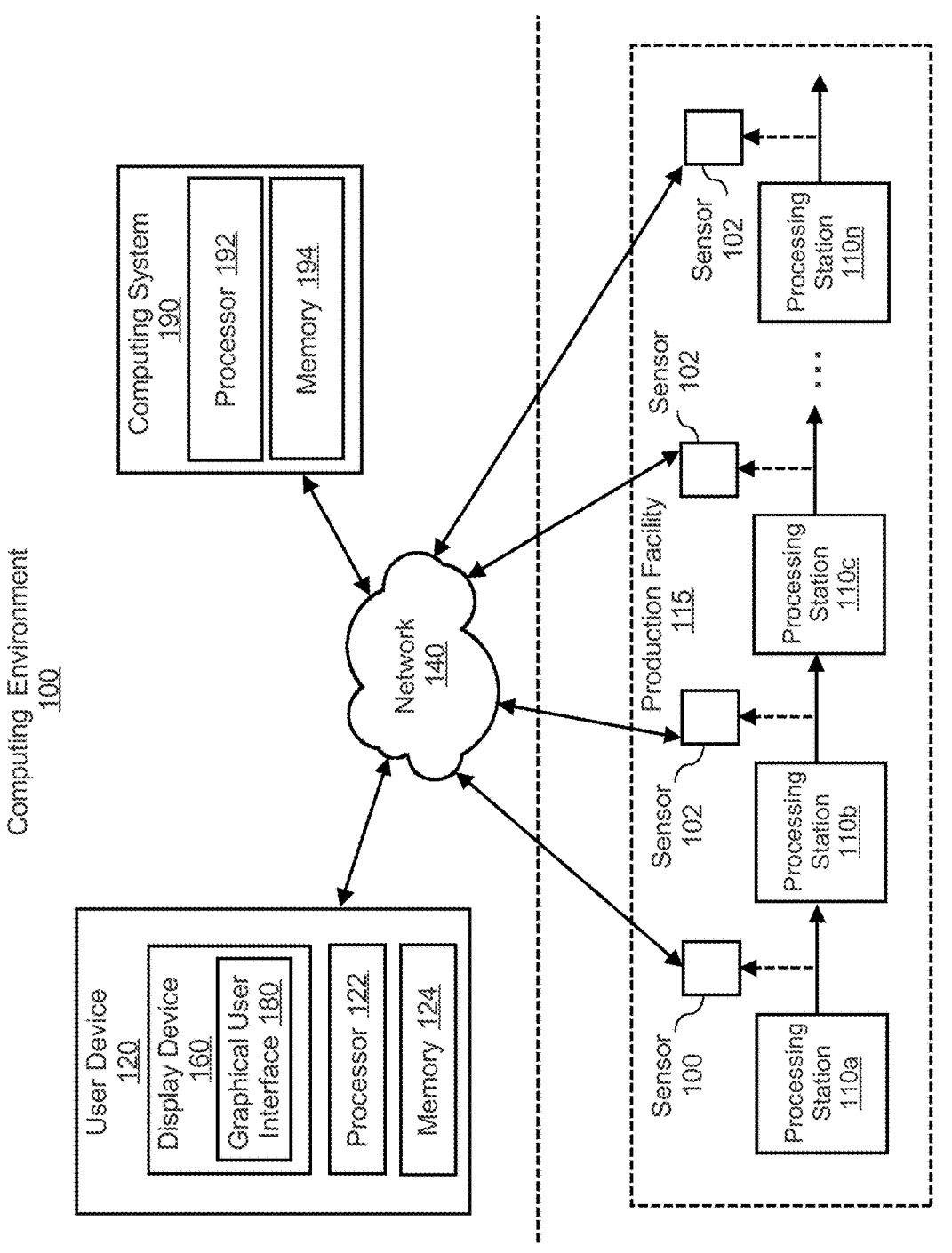
FIG. 1 depicts an example computing environment used in conjunction with sensors that can detect when a unit leaves a processing station at a production facility according to example embodiments of the present disclosure.

Example aspects of the present disclosure are directed systems and methods that can provide for improved computing systems and methods for controlling the activity of a production facility, such as a production facility having one or more automation environments. In some implementations, the systems and methods can implement control actions based at least in part on signals indicative of a measure of time since last unit has left a processing station in the production facility, fill levels at various processing stations or automation environments in the production facility, and/or predictive analytics of workflow.

In some embodiments, the systems and methods according to example embodiments of the present disclosure can receive signals that can be indicative of time since last unit has left a processing station and/or fill levels of a processing station in the facility. For instance, in some implementations, the systems and methods can determine a time since last unit has left a processing station. In some embodiments, one or more sensors can be located at a processing station. The sensor(s) can receive a signal indicative of a unit leaving a processing station. The systems and methods can receive data from the sensor(s) indicative of a unit leaving a processing station. The sensor(s) can be an optical sensor, mechanical sensor, or other sensor configured to detect a unit leaving a processing station in a production facility. The systems and methods can, based at least in part on data indicative of a unit leaving a processing station determine the time that has passed since a last unit has left a processing station.

In some embodiments, the systems and methods can use data associated with fill levels indicative of processing station capacity for units to be received at the station. The fill levels can be determined at least in part on signals indicative of units departing a processing station. The fill levels can be upstream fill levels for upstream processing stations and/or downstream fill levels for downstream processing stations. In some embodiments, the systems and methods can receive data indicative of a unit arriving at a processing station. The systems and methods can determine a fill level of a processing station based at least in part on data indicative of a unit arriving at a processing station, a processing station capacity, and/or data indicative of a unit leaving a processing station checkpoint. In some implementations the fill level can indicate that a processing station is at maximum capacity (e.g., cannot receive additional units). In some implementations the fill level can indicate that a processing station contains no units. Based at least in part on the fill levels and/or predictive analytics determined based at least in part on the fill levels, the systems and methods can determine an impact probability of a downtime event at a particular processing station on other stations and/or the production of the entire production facility or sub-group of processing stations.

In some implementations, the computing systems and methods can provide information for display on a Graphical User Interface (GUI) to facilitate interaction from a user to improve efficiency of a production facility. For example, the GUI can display information (e.g., information indicative of time since last unit, fill levels, checkpoints, alerts, badges, communications, etc.). The GUI can receive input from the user indicative of a response to the display of information.

In some embodiments, the systems and methods can determine a downtime event. For example, the downtime event can be determined based at least in part on a time since last unit and/or a threshold time since last unit value. For example, a downtime event can be indicative of a machine breakdown in a production facility.

In some implementations, the systems and methods can train one or more machine-learned models based at least in part on data from fill levels, downtime and/or data indicative of time since a last unit left a processing station. The machine-learned models can be trained to determine when data indicative of fill level buffers and/or downtime should result in a control action based on a downtime impact alert. The machine-learned models can also be used to predict future states of the production environment. The systems and methods can generate a communication (e.g., an alert message, a message indicating the impact of the downtime, etc.) and/or a workflow (e.g., counter measure, etc.). For example, a downtime impact alert can include providing for display on a user device a communication (e.g., an alert message, etc.) and/or generating a responsive workflow. In some examples, the downtime impact can be minimal if there is at least one of a downstream and/or upstream buffer.

In some embodiments, machine-learned models can be trained with an input of time since last unit left a processing station, downtime and/or fill levels. For example, data indicative of downtime accompanied by no downstream fill levels can result in a downstream blockage (e.g., bottleneck, etc.). As an additional example, data indicative of downtime accompanied by no upstream buffer can result in an upstream block. The machine-learned models can be trained to predict when a downstream blockage and/or upstream block will likely occur. In some embodiments, the systems and methods can also predict the duration of time between when a downtime even occurs and an impact on production will occur.

In some embodiments, the systems and methods can determine an impact probability. For example, an impact probability can be based at least in part on a downtime event and/or buffers. The impact probability can be a normalized score between 0 and 100. An impact probability of 100 can be indicative of a 100% probability that a downtime event will have an impact on overall facility production. For example, if a downtime event occurs at a processing station, the systems and methods can determine if the resulting stall in production will be localized to neighboring processing stations and/or the entire production facility.

In some implementations, the systems and methods can provide a user interface for forecasting the workflow of a production facility. In response, the systems and methods can predict fill levels of one or more processing stations. In particular implementations, the systems and methods can provide data indicative of optimizing breaks and/or overtime of a shift in a facility to increase production facility efficiency.

In some embodiments, the systems and methods can train machine-learned models to output suggested overtime decisions. For example, the systems and methods can receive data indicative of a production goal. The systems and methods can provide recommendations for future overtime decisions based at least in part on the production goal. The recommendations for future overtime can include at least one of break run-throughs, week-day overtime, and/or week-end overtime.

In some embodiments, the systems and methods can provide for display on the user interface data indicative of a totem chart representative of one or more processing stations. The totem chart can include a visual representation of the current fill level of one or more processing stations compared to the one or more processing station's respective maximum capacities. The totem chart can display the processing stations in the order in which a unit arrives and departs from the processing stations to move through the production facility.

The systems, methods, and approaches described herein, can provide several advantages, technical benefits, and/or improvements to computing technology. For instance, the systems and methods described herein provides for more efficient display of information and receiving of input from a user, as a result, computing resources can be reserved for other core functions, such as conducting predictive analytics or training machine-learned models. In addition, the systems and methods described herein can provide for training of machine-learned models based on data indicative of time since a unit left a processing station and/or fill levels of processing stations to provide unique and efficient training parameters for the machine-learned models.

FIG. 1 depicts an example computing environment 100 in which a sensor 102*a* . . . 102*n* can be integrated according to example embodiments of the present disclosure. As shown, the sensors 102*a* . . . 102*n* can be in communication with the processing stations 110*a* . . . 110*n*. The sensors 102*a* . . . 102*n* can be any device used to detect when a unit leaves a processing station 110*a* . . . 110*n* at a production facility 115. The sensors 202 can include one or more cameras, motion sensors, optical sensors (e.g., lasers), other types of imaging capture devices, weight sensors, and/or other sensors.

The production facility 115 can be any kind of production facility. For example, the production facility 115 can be an automotive coating facility. The processing stations 110*a* . . . 110*n* can be any kind of station at a production facility 115. For example, in some embodiments, processing station 110*a* can be an entry processing station, processing station 110*b* can be a waxing processing station, and processing station 110*n* can be a stacker processing station.

The sensors 102*a* . . . 102*n* can be in communication with a user device 120 and/or computing system 190 for instance, via a network 140. In some embodiments, a user can control, view information, and/or specify one or more settings associated with the sensor 102*a* . . . 102*n* via a graphical user interface 180 implemented on a display of the user device 120. For instance, a user can access an application implemented on the user device 120. The application can present a graphical user interface 180 on a display 160 of the user device 120. A user can interact with the graphical user interface 180 to control operation of the sensor 102 and/or one or more processing stations 110*a* . . . 110*n*.

The network 140 can be a local area network and/or a wide area network. A local area network can be any suitable type of network or combination of networks that allows for communication between devices. In some embodiments, the network(s) can include one or more of a secure network, Wi-Fi network, IoT network, mesh network, one or more peer-to-peer communication links, and/or some combination thereof, and can include any number of wired or wireless links. The network 140 can be a wide area network. The wide area network can be, for instance, the Internet, cellular network, or other network, and can include any number of wired or wireless links. Communication over the network 140 can be accomplished, for instance, via a communication interface using any type of protocol, protection scheme, encoding, format, packaging, etc. As shown, the sensor 102 can communicate information over the network 140 to user device 120 and/or remote computing system 190.

The computing environment 100 can include user device 120 and/or remote computing system 190. The remote computing systems 190 can be associated with a cloud computing platform for implementation of one or more services for the sensor 102. Data collected by the cloud computing platform can be processed and stored and provided, for instance, to a user device 120 (e.g., for presentation in a graphical user interface 180).

The computing environment 100 can include remote computing system 190. The remote computing system 190 can be associated with the production facility. Data collected by the sensors 102a . . . 102n can be communicated to the remote computing system 190 for monitoring production facility activity.

Data indicative of user input can be received by the user device 120 and communicated to the remote computing system 190.

The remote computing system 190 can include one or more computing devices (e.g., servers) having one or more processors 192 and one or more memory devices 194. The user device 120 can have one or more processors 122 and one or more memory device 124. The computing system 190 can be distributed such that its components are located in different geographic areas. The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Figure 2:
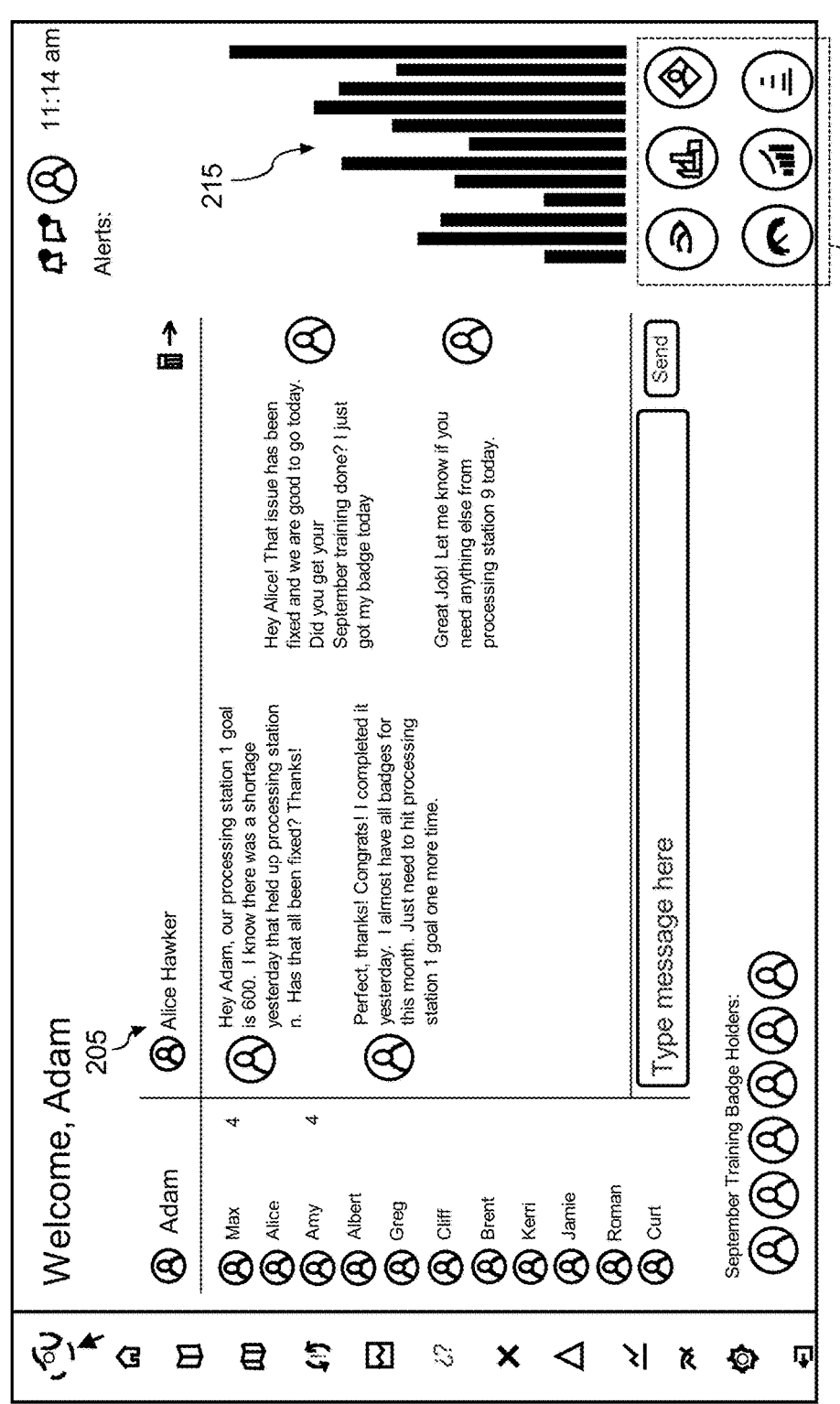
FIG. 2 depicts an example user interface according to example embodiments of the present disclosure.

FIG. 2 depicts an example user interface 200 for the present disclosure. The user interface 200 can include a chat function 205. The systems and methods can facilitate user-to-user communication. The systems and methods can facilitate user-to-bot communication. The systems and methods can generate messages sent from a bot in response to an output from a machine-learned model. The user interface 200 can also display badges 210 indicative of a user's action in the facility. Additionally or alternatively, the user interface 200 can depict the volume 215 a user and/or group of users have achieved in one or more areas. The computing systems and methods can provide for display data indicative of positive reinforcement for users.

Figure 3:
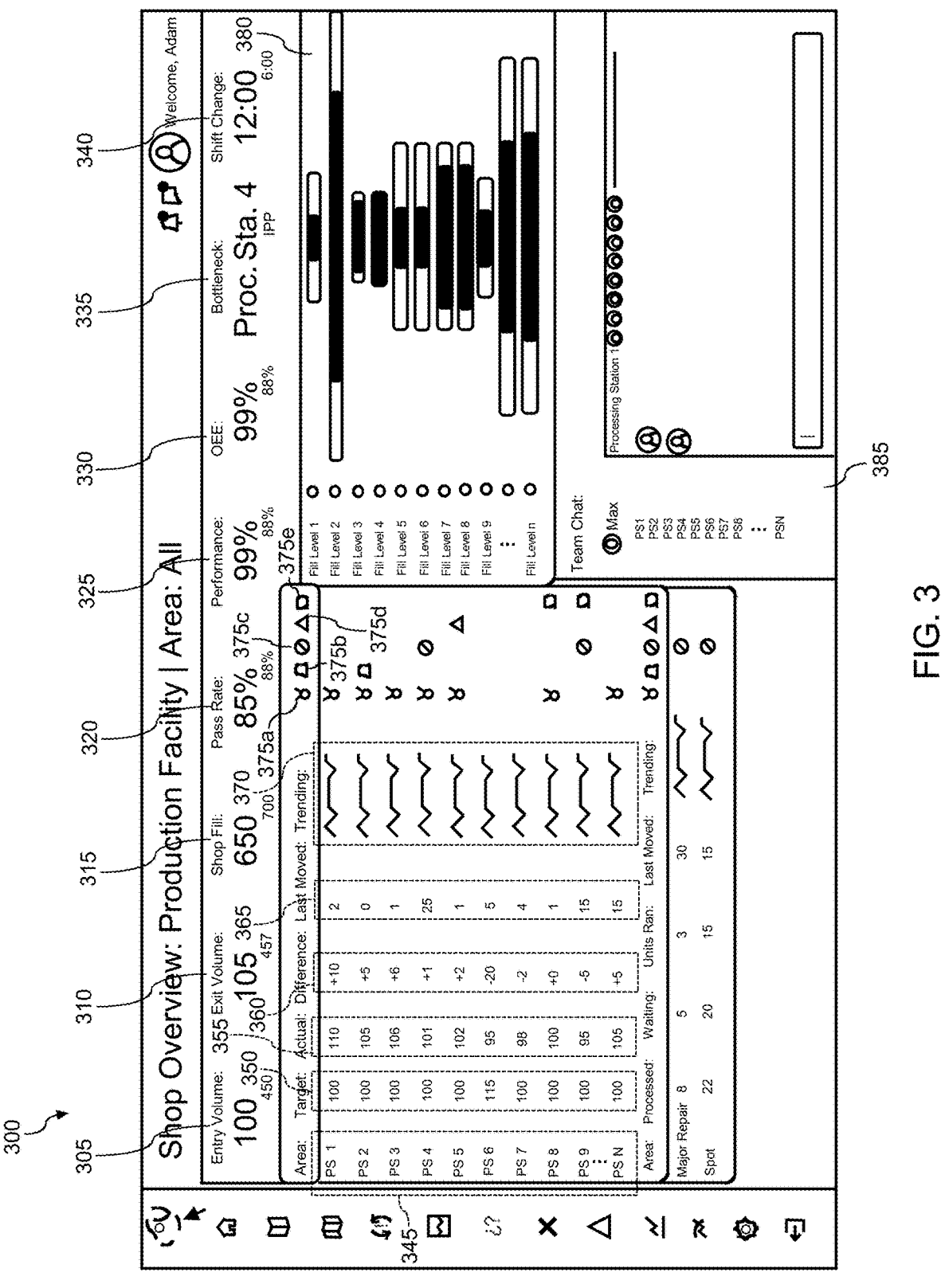
FIG. 3 depicts an example user interface according to example embodiments of the present disclosure.

FIG. 3 depicts an example user interface 300 for the present disclosure. The user interface 300 can display information. For example, the information can be indicative of the number of units that entered a facility and/or processing station (e.g., entry volume 305, etc.), the number of units that exited a facility and/or processing station (e.g., exit volume 310, etc.), a shop fill value 315, a pass rate 320, a performance rate 325, an Overall Operations Effectiveness 330, a warning 335, and/or shift change 340.

Additionally or alternatively, the user interface 300 in FIG. 3 can display various processing stations 345 of the production facility. The user interface 300 can display target unit leaving a processing station data 350, actual unit leaving a processing station data 355, the difference between the actual unit leaving a processing station data and the target unit leaving a processing station data 360, the time since last unit left the processing station 365, trend lines 370, and/or icons 375a-375e (e.g., indicative of good job, alerts, warnings, breaks, downtime, etc.). The user interface 300 can also include a totem chart 380 indicative of fill levels of respective processing stations. The user interface 300 can include a chat function 385. The systems and methods can facilitate user-to-user and/or user-to-bot communication through the chat function of the user interface 300.

Figure 4:
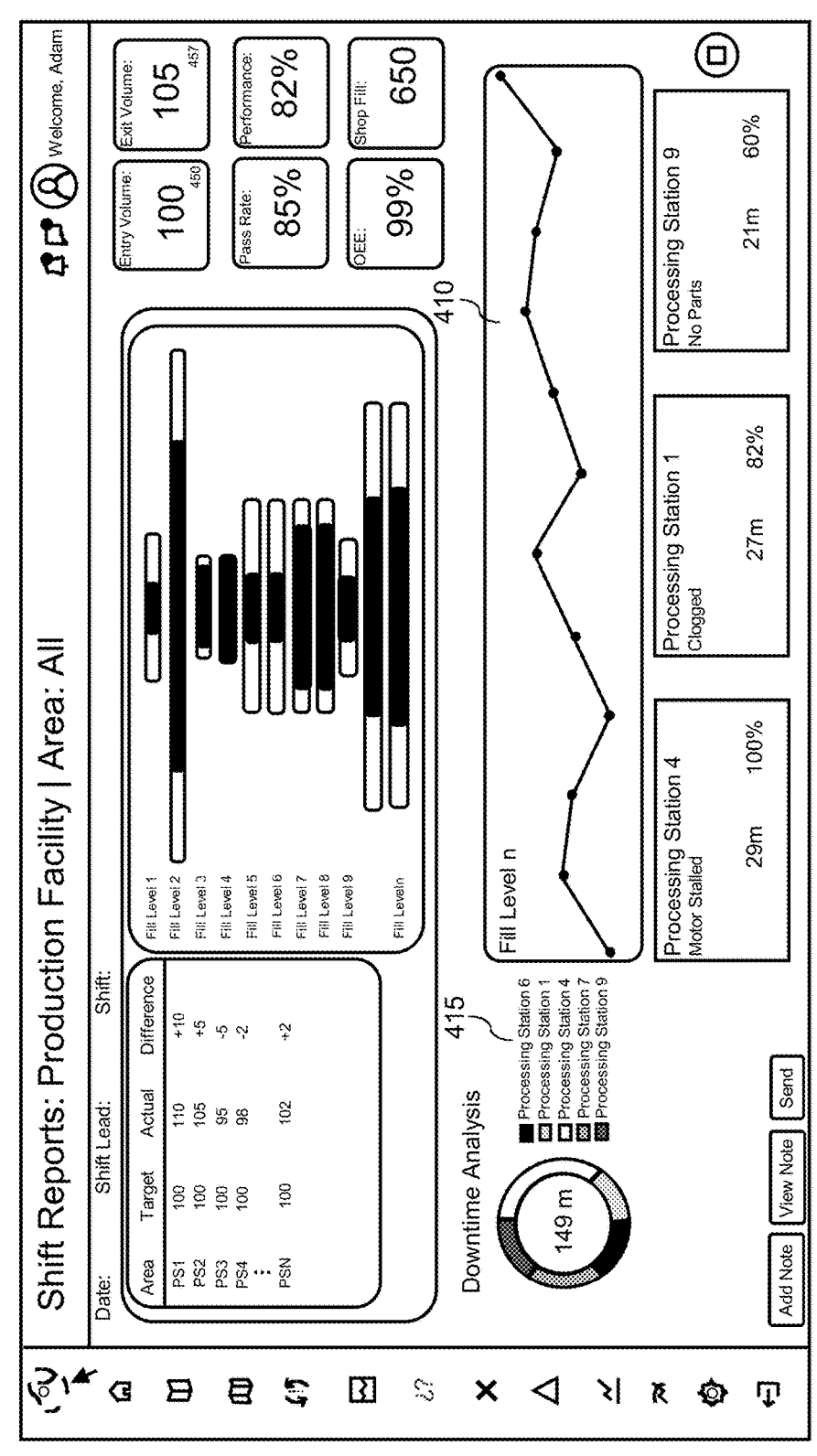
FIG. 4 depicts an example user interface according to example embodiments of the present disclosure.

FIG. 4 depicts an example user interface 400 for the present disclosure. The user interface 400 can display data indicative of a specific shift of workers at a production facility. The user interface 400 can display information of trends 410 and/or downtime analysis 415 for specific shifts.

Figure 5:
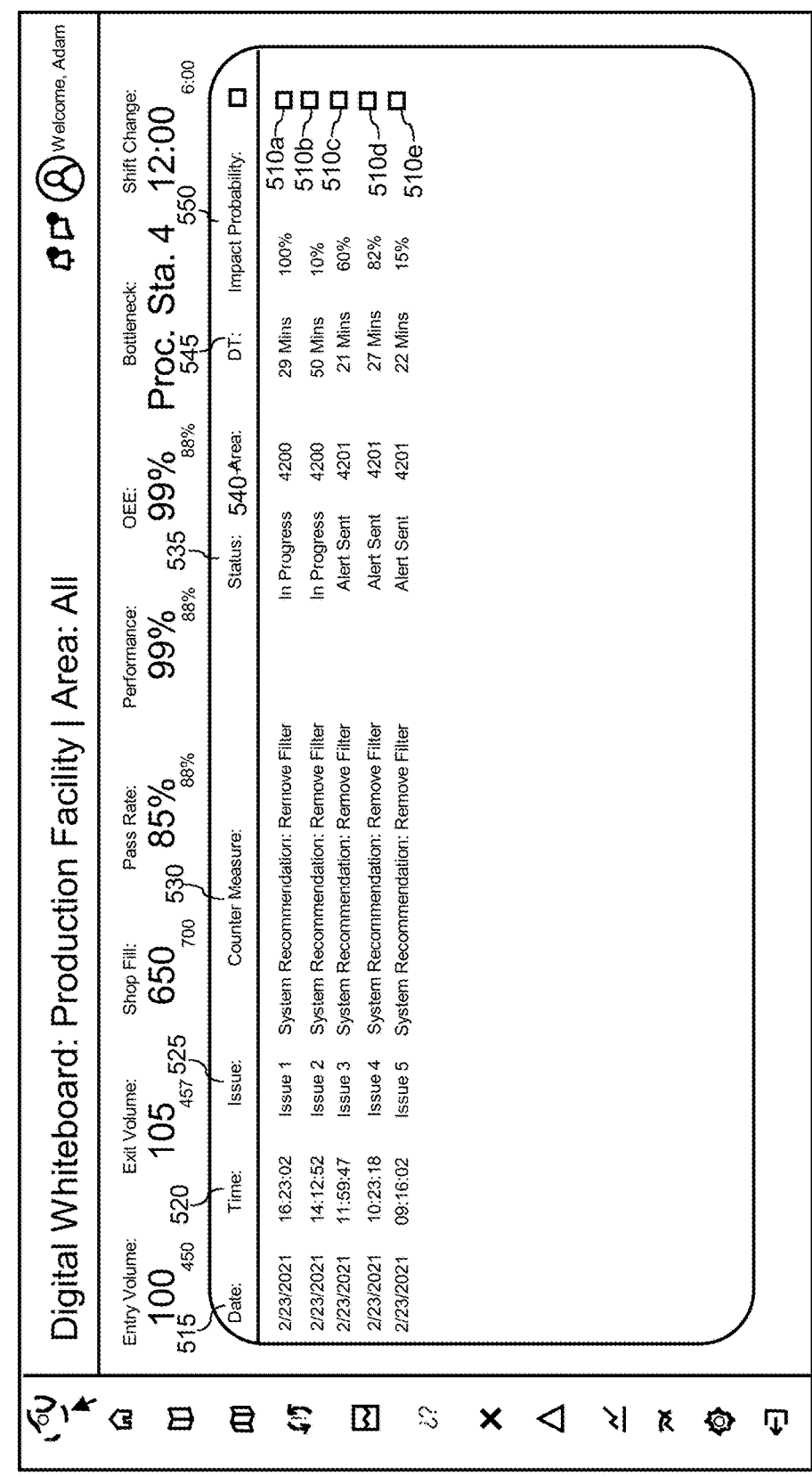
FIG. 5 depicts an example user interface according to example embodiments of the present disclosure.

FIG. 5 depicts an example user interface 500 for the present disclosure. The user interface 500 depicts alerts 510a-510e. The user interface can display information indicative of a date 515, time 520, issue 525, counter measure 530, status 535, area 540, downtime 545, and/or impact probability 550.

Figure 6:
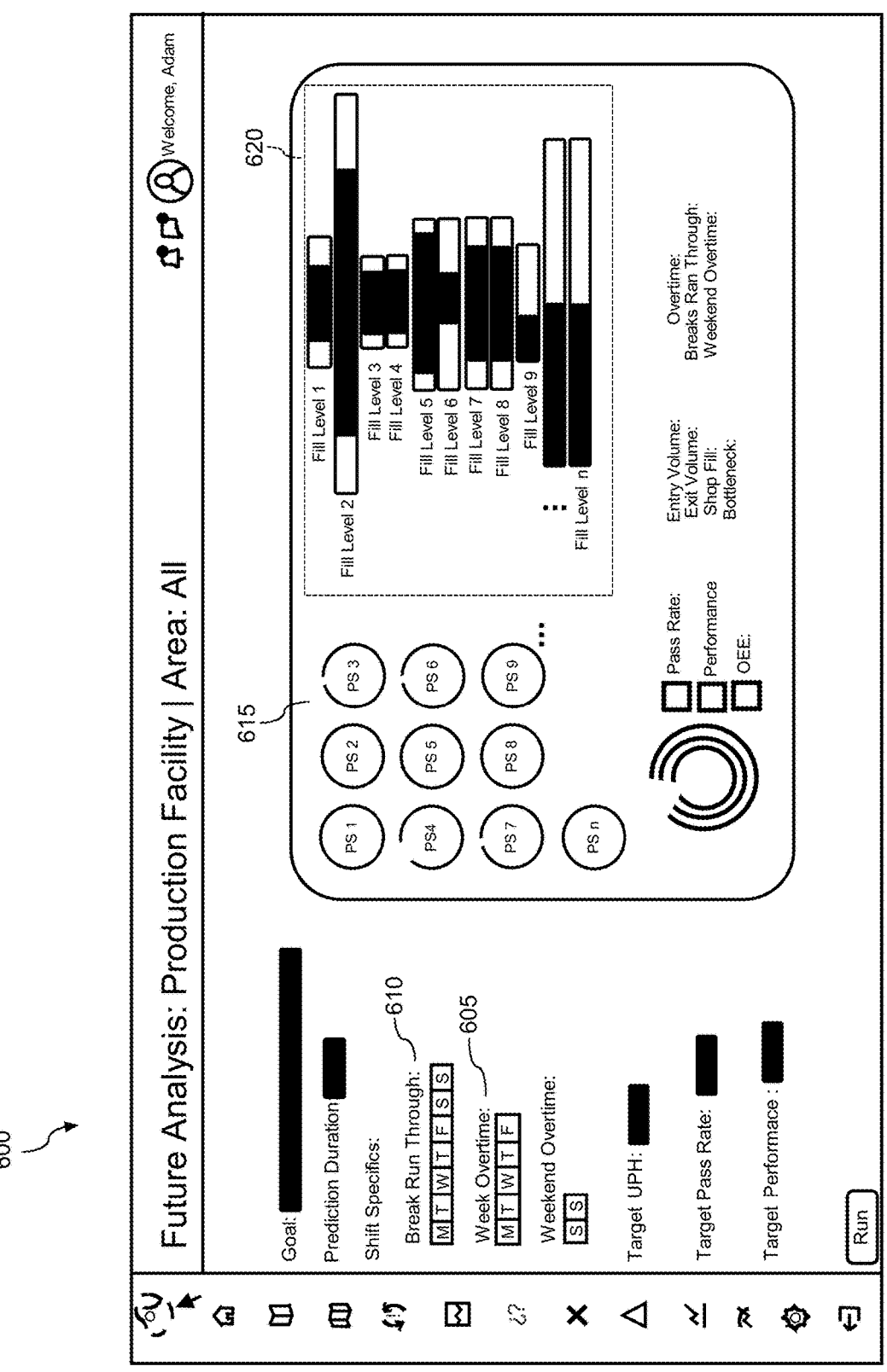
FIG. 6 depicts an example user interface according to example embodiments of the present disclosure.

FIG. 6 depicts an example user interface 600 for the present disclosure. The user interface 600 depicts the interface a user can interact with when requesting the systems and methods perform optimization to determine strategic planning of breaks and/or overtime. The user can select overtime 605, break run-throughs 610, etc. for specific shifts and/or the systems and methods can provide for display the impact 615 of the overall fill levels in the totem chart 620 in response to the chosen parameters. The machine-learned model can predict the outcome based on the parameters entered.

Figure 7:
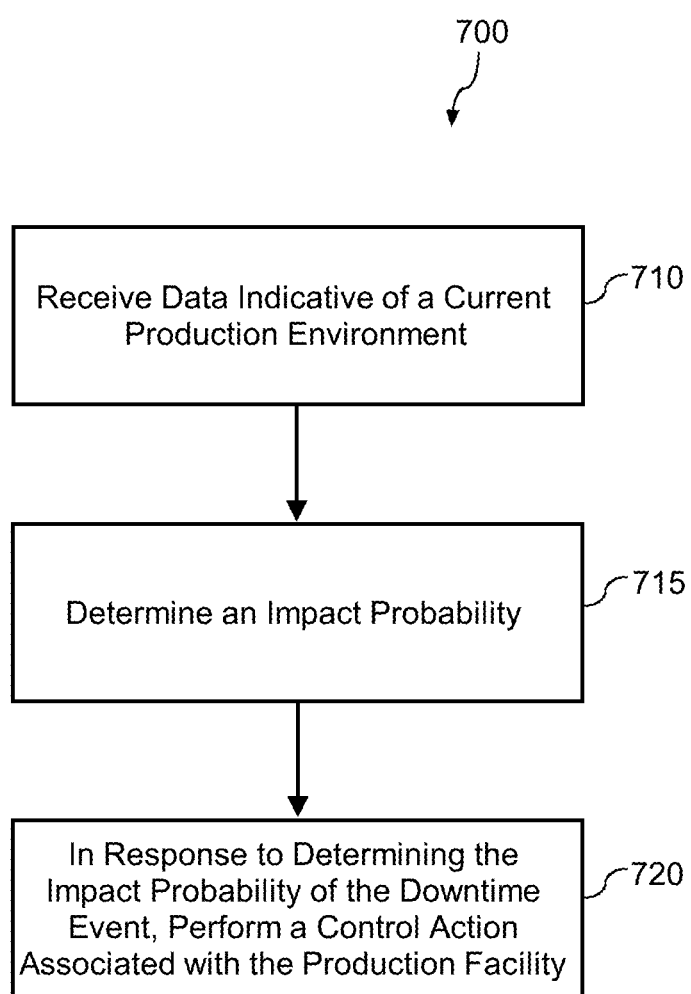
FIG. 7 a flowchart of an example method according to example embodiments of the present disclosure.

FIG. 7 depicts a flowchart diagram of an example method for controlling the activity of a production facility, such as a production facility having one or more automation environments according to example embodiments of the present disclosure. One or more portion(s) of the method 700 can be implemented by one or more computing devices such as, for example, the computing devices/systems described in FIGS. 1 and/or 8. Moreover, one or more portion(s) of the method 700 can be implemented as an algorithm on the hardware components of the device(s) described herein (e.g., as in FIGS. 1 and/or 8, etc.). For example, a computing system can include one or more processors and one or more non-transitory, computer-readable media storing instructions that are executable by the one or more processors to cause the computing system to perform operations, the operations including one or more of the operations/portions of method 700. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (710), the method 700 can include receiving data indicative of a current production environment. For instance, a computing system (e.g., computing system 190 or 800) can receive data indicative of a current production environment. As described herein, the data indicative of the current production environment comprises at least one of data from a sensor indicative of time since last unit or fill levels at one or more processing stations in a production facility. By way of example, the sensor comprises at least one of an optical sensor or a mechanical sensor. In some implementations, sensors can include one or more cameras, motion sensors, optical sensors (e.g., lasers), other types of imaging capture devices, weight sensors, and/or other sensors.

Data indicative of the current production environment can include fill levels, downtime, and/or data indicative of time since a last unit left a processing station.

At (715), the method 700 can include determining an impact probability. For instance, a computing system (e.g., computing system 190 or 800) can determine an impact probability. As described herein, the impact probability of a downtime event can be based at least in part on the data indicative of the current production environment.

By way of example, determining the impact probability can include determining a time that has passed since a last unit has left a first upstream processing station of the one or more processing stations. Determining the impact probability can include determining a downstream fill level for a first downstream processing station. Determining the impact probability can include determining the impact probability of the downtime event based on at least one of the time that has passed since the last unit has left the first upstream processing station or the downstream fill level for the first downstream processing station.

In some implementations, the impact probability is a normalized score between 1 and 100. By way of example a 0% probability can be indicative of a 0% chance that there is an effect on overall production of facility. By way of example, a 100% probability can be indicative of a 100% chance that there is an effect on overall production of the facility. In some implementations, the impact probability can be indicative of an impact on a subgroup of processing stations. While the present disclosure may refer to set numbers of processing stations, this method can be utilized for any number of processing stations.

In some implementations, determining the downstream fill level for the first downstream processing station is based on (i) data indicative of a unit arriving at the first downstream processing station, (ii) data indicative of a processing station capacity of the first downstream processing station, and (iii) data indicative of the unit leaving a processing station checkpoint of the first downstream processing station.

For instance, method 700 can include determining that the downstream fill level for the first downstream processing station is at a maximum capacity. In response to determining that the downstream fill level for the first downstream processing station is at maximum capacity, the method can include determining that the impact probability of the downtime event for the production facility is a first probability. The method 700 can include determining that a second downstream fill level for a second downstream processing station contains no unit. In response to determining that the downstream fill level for the second downstream processing station is at contains no unit, determining that the impact probability of the downtime event for the production facility is a second probability, wherein the second probability is greater than the first probability.

In some instances, a second probability can be a high probability. A high probability can be a probability that is above a set threshold. For instance, in some implementations a threshold probability can be 95%, 90%, 85%, or any other probability between 0% and 100%. In some implementations the threshold probability can be manually set. Additionally or alternatively, the threshold probability can be determined by one or more machine-learned models.

Method 700 can include determining that determining a downtime event has occurred at a second processing station. A downtime event can include the determination that a number of units have entered a processing station without any units departing a processing station or an indication that a processing station has stopped production. Method 700 can include determining that the downtime event has a 0% impact probability of a stall of production for an entire facility. The method 700 can include performing no control action based on the determination that the impact probability is 0%.

Method 700 can include scaling the control action to be proportional to the impact probability of the associated downtime event. For example, the display of a notification can change based on the severity (e.g., dynamic versus static notification, color used for the notification, halting automation occurring at other processing stations, or other control actions described herein).

In some implementations, method 700 can include training at least one machine-learned model to determine an impact probability based on fill level data, downtime data, and data indicative of time since last unit left in a processing station. By way of example, the impact probability is indicative of at least one of an upstream block or a downstream blockage.

Additionally or alternatively, the impact probability can be determined using a machine-learned model. By way of example, the machine-learned model can be the machine-learned model trained to determine the impact probability.

In some implementations, determining the impact probability includes determining a downtime event has occurred at a first processing station. Determining the impact probability can include determining that the downtime event will result in a stall of production for an entire facility. Determining the impact probability can include performing the control action based on the determination that the downtime event will result in a stall production for the entire facility.

The impact probability can be indicative of at least one of an upstream block or a downstream blockage. For example, the method can include obtaining sensor data indicative of 5 units arriving at a processing station, a max capacity of 10 units at the processing station, and data indicative of 3 units leaving the processing station. This can be indicative of 2 out of 10 slots of capacity at the processing station being filled. Thus, there can be a "buffer" of about 8 slots that can be filled before there is a blockage at that particular filling station.

In an additional or alternative example, the computing system can determine that a first station has stopped production (e.g., a downtime event) but has 10/40 units in the processing station, a second station has 35/50 units in the processing station, and a third station has 15/25 units in the processing station. Traditional system might provide a cross system alert about the station being stopped, whereas the first station being stopped may be possible to be remedied without having downstream effects on the second processing station and third processing station. The system can thus take into account the production facility as a whole, including an analysis of the overall impact of an event at a respective processing station on whether that will have an impact on overall (e.g., end) output.

At (720), the method 700 can include in response to determining the impact probability of the downtime event, performing a control action associated with the production facility. For instance, a computing system (e.g., computing system 190 or 800) can perform, in response to determining the impact probability of the downtime event, a control action associated with the production facility. By way of example, the control action associated with the production facility comprises at least one of (i) providing a notification of a downtime, (ii) controlling automation equipment in response to an impact alert, (iii) accessing a machine-learned model to provide analytics associated with a future use state, or (iv) providing one or more recommendations on one or more production resources.

In some implementations, the control action comprises accessing a machine-learned model to provide analytics associated with a future use state. For example, analytics associated with a future use state can include characteristics described herein. By way of example, FIG. 6 depicts example predictions associated with the future use state of the facility. Information can include recommendations to optimize strategic planning for breaks and/or scheduling overtime. In some implementations, a user can provide input for specific features to optimize for. For example, features can include overtime, break run-through, etc. for specific shifts. In response, the computing system can generate and provide for display a graphical representation of the impact on overall fill levels. The impact can be displayed in the form of a totem chart. The graphical representation can be indicative of the impact of the chosen parameters on predicted outcome. In some implementations, the machine-learned method generates the prediction.

In some implementations, the control action comprises transmitting data which causes information to be provided for display via a Graphical User Interface (GUI). For example, the GUI comprises a plurality of selectable user interface components and wherein the GUI is configured to receive input from a user indicative of a response to the information provided for display.

Various GUIs are described with respect to FIG. 2-FIG. 5. These GUIs depict several interactive and informative elements. In some implementations, these elements are selectable elements. In some implementations, the method includes obtaining data indicative of user input via the graphical user interface. In response to obtaining the data indicative of user input (e.g., of selection of one or more selectable elements), the system can perform various actions (e.g., updating the GUI). The GUI can be dynamically updated by the system to display relevant information more prominently (e.g., as a control action).

Additionally or alternatively, the control action can include transmitting data which causes information to be provided for display via a Graphical User Interface (GUI). The data can include a forecast of a workflow of the production facility. The forecast of the workflow of the production facility comprises predicted fill levels for the one or more processing stations. In some implementations a forecast of a workflow of the production facility includes a totem chart (e.g., totem chart 380, 620). The totem chart can include data indicative of the one or more processing stations in a processing order of the production facility. The processing order can be indicative of the processing order in which a unit arrives and departs from the respective processing stations of the one or more processing stations to move through the production facility.

Figure 8:
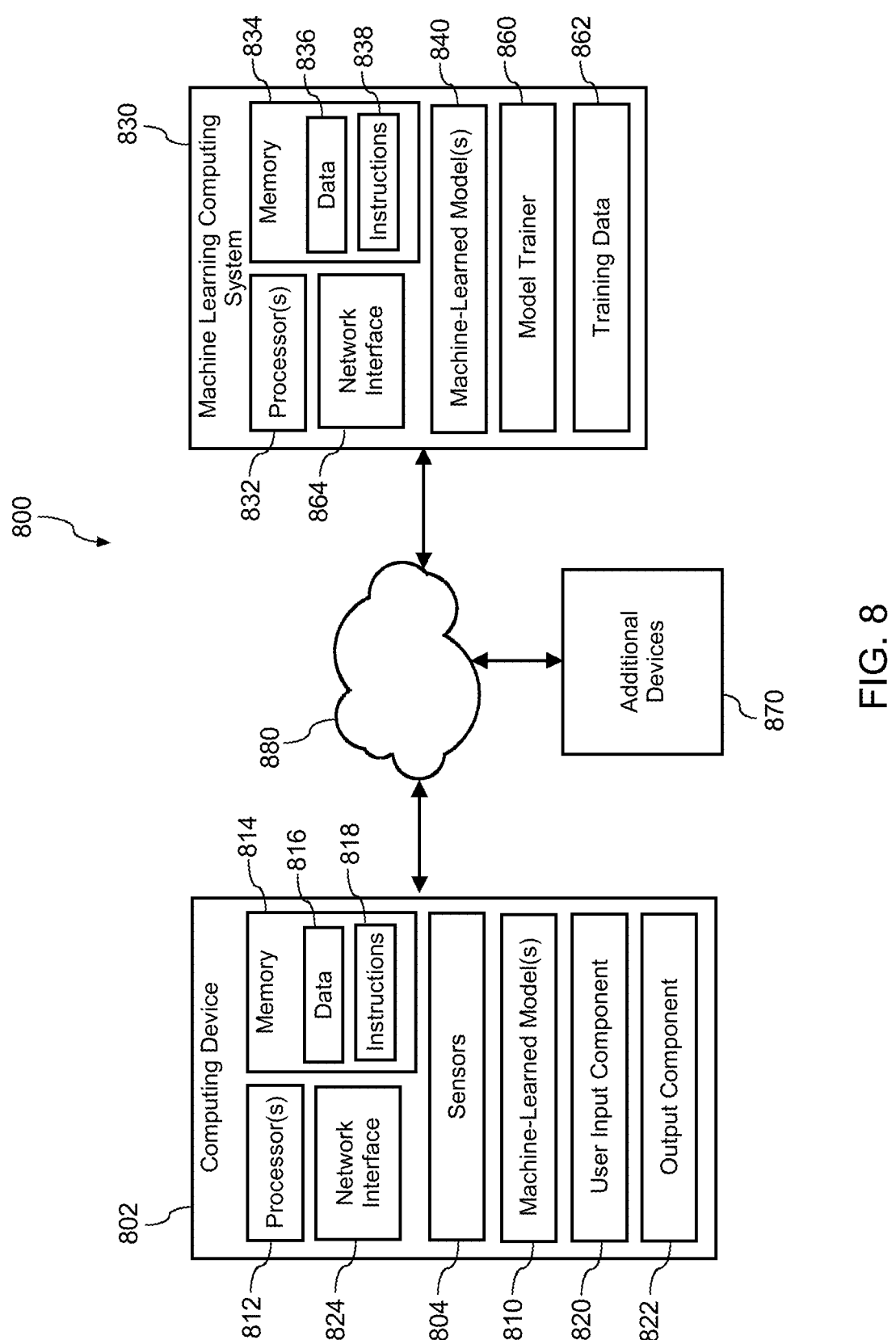
FIG. 8 depicts an example computing system according to example embodiments of the present disclosure.

FIG. 8 depicts an example computing system 800 for machine-learning-based prediction of downtime and/or impact probability of an event in a production facility according to example embodiments of the present disclosure. The example computing system 800 includes a computing device 802 and a machine learning computing system 830 that are communicatively coupled over a network 880.

The computing device 802 includes one or more processors 812 and a memory 814. The one or more processors 812 can be any suitable processing device (e.g., a processor core, a microprocessor, an ASIC, a FPGA, a controller, a microcontroller, etc.) and can be one processor or a plurality of processors that are operatively connected. The memory 814 can include one or more non-transitory computer-readable storage media, such as RAM, ROM, EEPROM, EPROM, one or more memory devices, flash memory devices, etc., and combinations thereof.

The memory 814 can store information that can be accessed by the one or more processors 812. For instance, the memory 814 (e.g., one or more non-transitory computer-readable storage mediums, memory devices) can store data 816 that can be obtained, received, accessed, written, manipulated, created, and/or stored. In some implementations, the computing device 802 can obtain data from one or more memory device(s) that are remote from the device 802.

The memory 814 can also store computer-readable instructions 818 that can be executed by the one or more processors 812. The instructions 818 can be software written in any suitable programming language or can be implemented in hardware. Additionally, or alternatively, the instructions 818 can be executed in logically and/or virtually separate threads on processor(s) 812.

For example, the memory 814 can store instructions 818 that when executed by the one or more processors 812 cause the one or more processors 812 to perform any of the operations and/or functions described herein.

According to an aspect of the present disclosure, the computing device 802 can store or include one or more machine-learned models 810. For example, the machine-learned models 810 can be or can otherwise include various machine-learned models such as a random forest classifier; a logistic regression classifier; a support vector machine; one or more decision trees; a neural network; and/or other types of models including both linear models and non-linear models. Example neural networks include feed-forward neural networks, recurrent neural networks (e.g., long short-term memory recurrent neural networks), convolutional neural networks, or other forms of neural networks.

In some implementations, the computing device 802 can receive the one or more machine-learned models 810 from the machine learning computing system 830 over network 880 and can store the one or more machine-learned models 810 in the memory 814. The computing device 802 can then use or otherwise run the one or more machine-learned models 810 (e.g., by processor(s) 812).

The machine learning computing system 830 includes one or more processors 832 and a memory 834. The one or more processors 832 can be any suitable processing device (e.g., a processor core, a microprocessor, an ASIC, a FPGA, a controller, a microcontroller, etc.) and can be one processor or a plurality of processors that are operatively connected. The memory 834 can include one or more non-transitory computer-readable storage media, such as RAM, ROM, EEPROM, EPROM, one or more memory devices, flash memory devices, etc., and combinations thereof.

The memory 834 can store information that can be accessed by the one or more processors 832. For instance, the memory 834 (e.g., one or more non-transitory computer-readable storage mediums, memory devices) can store data 836 that can be obtained, received, accessed, written, manipulated, created, and/or stored. In some implementations, the machine learning computing system 830 can obtain data from one or more memory device(s) that are remote from the machine learning computing system 830.

The memory 834 can also store computer-readable instructions 838 that can be executed by the one or more processors 832. The instructions 838 can be software written in any suitable programming language or can be implemented in hardware. Additionally, or alternatively, the instructions 838 can be executed in logically and/or virtually separate threads on processor(s) 832.

For example, the memory 834 can store instructions 838 that when executed by the one or more processors 832 cause the one or more processors 832 to perform any of the operations and/or functions described herein.

In some implementations, the machine learning computing system 830 includes one or more server computing devices. If the machine learning computing system 830 includes multiple server computing devices, such server computing devices can operate according to various computing architectures, including, for example, sequential computing architectures, parallel computing architectures, or some combination thereof.

In addition or alternatively to the machine-learned model(s) 810 at the computing device 802, the machine learning computing system 830 can include one or more machine-learned models 840. For example, the models 840 can be or can otherwise include various machine-learned models such as a random forest classifier; a logistic regression classifier; a support vector machine; one or more decision trees; a neural network; and/or other types of models including both linear models and non-linear models. Example neural networks include feed-forward neural networks, recurrent neural networks (e.g., long short-term memory recurrent neural networks), convolutional neural networks, or other forms of neural networks.

As an example, the machine learning computing system 830 can communicate with the computing device 802 according to a client-server relationship. For example, the machine learning computing system 830 can implement the machine-learned models 840 to provide a web service to the computing device 802.

Thus, machine-learned models 810 can be located and used at the computing device 802 and/or machine-learned models 840 can be located and used at the machine learning computing system 830.

In some implementations, the machine learning computing system 830 and/or the computing device 802 can train the machine-learned models 810 and/or 840 through use of a model trainer 860. The model trainer 860 can train the machine-learned models 810 and/or 840 using one or more training or learning algorithms. One example training technique is backwards propagation of errors ("backpropagation").

In some implementations, the model trainer 860 can perform supervised training techniques using a set of labeled training data 862. In other implementations, the model trainer 860 can perform unsupervised training techniques using a set of unlabeled training data. The model trainer 860 can perform a number of generalization techniques to improve the generalization capability of the models being trained. Generalization techniques include weight decays, dropouts, or other techniques. The model trainer 860 can be implemented in hardware, software, firmware, or combinations thereof.

The computing device 802 can also include a network interface 824 used to communicate with one or more systems or devices, including systems or devices that are remotely located from the computing device 802. The network interface 824 can include any circuits, components, software, etc. for communicating with one or more networks (e.g., 880). In some implementations, the network interface 824 can include, for example, one or more of a communications controller, receiver, transceiver, transmitter, port, conductors, software and/or hardware for communicating data. Similarly, the machine learning computing system 830 can include a network interface 864.

The computing device 802 can also include one or more sensors 804. For example, the one or more sensors 804 can include any type of sensor useful to collect data about an environment of the computing device 802.

The computing device 802 can also include a user input component 820. For example, the user input component 820 can include a microphone, a keypad, a keyboard, a click-wheel, buttons, and/or a touch-sensitive screen.

The computing device 802 can also include an output component 822. For example, the output component 822 can include a speaker, a haptic output component, and/or a display (e.g., a touch-sensitive display).

As another example, the computing device 802 can transmit information to one or more additional devices 870 (e.g., network devices, etc.). The computing device 802 can communicate with the additional computing device(s) 870 over the network 880 and/or via a local, short-range wireless communication protocol (e.g., Bluetooth).

The network(s) 880 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 880 can be accomplished, for instance, via a network interface using any type of protocol, protection scheme, encoding, format, packaging, etc.

FIG. 7 illustrates one example computing system 800 that can be used to implement the present disclosure. Other computing systems can be used as well. For example, in some implementations, the computing device 802 can include the model trainer 860 and the training dataset 862. In such implementations, the machine-learned models 810 can be both trained and used locally at the computing device 802. As another example, in some implementations, the computing device 802 is not connected to other computing systems.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method comprising:
receiving, by a computing system comprising one or more processors, data indicative of a current production environment, wherein the data indicative of the current production environment comprises (i) data from a sensor indicative of time since last unit from an upstream processing station and (ii) a fill level at one or more downstream processing stations in a production facility;
determining, by the computing system, a predictive impact probability indicative of a likelihood that a current downtime event at a first processing station will cause a future downtime event at a second processing station, wherein the predictive impact probability of the current downtime event is based at least in part on the data indicative of the current production environment; and
in response to determining the predictive impact probability of the current downtime event, performing, by the computing system, a control action associated with the production facility.

2. The computer-implemented method of claim 1, wherein the control action associated with the production facility comprises at least one of (i) providing a notification of a downtime, (ii) controlling automation equipment in response to an impact alert, or (iii) providing one or more recommendations on one or more production resources.

3. The computer-implemented method of claim 1, wherein the control action associated with the production facility comprises accessing a machine-learned model to provide analytics associated with a future use state.

4. The computer-implemented method of claim 1, wherein determining the impact probability comprises:
determining a time that has passed since a last unit has left a first upstream processing station of the one or more processing stations;
determining a downstream fill level for a first downstream processing station; and
determining the predictive impact probability of the downtime event based on at least one of the time that has passed since the last unit has left the first upstream processing station or the downstream fill level for the first downstream processing station.

5. The computer-implemented method of claim 4, wherein determining the downstream fill level for the first downstream processing station is based on (i) data indicative of a unit arriving at the first downstream processing station, (ii) data indicative of a processing station capacity of the first downstream processing station, and (iii) data indicative of the unit leaving a processing station checkpoint of the first downstream processing station.

6. The computer-implemented method of claim 4, comprising:
determining that the downstream fill level for the first downstream processing station is at a maximum capacity; and
in response to determining that the downstream fill level for the first downstream processing station is at maximum capacity, determining that the predictive impact probability of the downtime event for the production facility is a first probability.

7. The computer-implemented method of claim 6, comprising:

determining that a second downstream fill level for a second downstream processing station contains no unit; and
in response to determining that the downstream fill level for the second downstream processing station contains no unit, determining that the predictive impact probability of the downtime event for the production facility is a second probability is greater than the first probability.

8. The computer-implemented method of claim 1, wherein the control action comprises transmitting data which causes information to be provided for display via a Graphical User Interface (GUI).

9. The computer-implemented method of claim 8, wherein the GUI comprises a plurality of selectable user interface components and wherein the GUI is configured to receive input from a user indicative of a response to the information provided for display.

10. The computer-implemented method of claim 1, comprising:
training at least one machine-learned model to determine a predictive impact probability based on fill level data, downtime data, and data indicative of time since last unit left in a processing station.

11. The computer-implemented method of claim 10, wherein the predictive impact probability is indicative of at least one of an upstream block or a downstream blockage.

12. The computer-implemented method of claim 1, wherein the predictive impact probability is determined using a machine-learned model.

13. A computing system comprising:
one or more processors; and
one or more non-transitory computer-readable media storing instructions that are executable to cause the one or more processors to perform operations, the operations comprising:
receiving, by the computing system, data indicative of a current production environment, wherein the data indicative of the current production environment comprises (i) data from a sensor indicative of time since last unit from an upstream processing station and (ii) a fill level at one or more downstream processing stations in a production facility;
determining, by the computing system, a predictive impact probability indicative of a likelihood that a current downtime event at a first processing station will cause a future downtime event at a second processing station, wherein the predictive impact probability of the current downtime event is based at least in part on the data indicative of the current production environment; and
in response to determining the predictive impact probability of the current downtime event, performing, by the computing system, a control action associated with the production facility.

14. The computing system of claim 13, wherein the predictive impact probability is a normalized score between 1 and 100.

15. The computing system of claim 13, wherein determining the predictive impact probability comprises:
determining a downtime event has occurred at a first processing station;
determining that the downtime event will result in a stall of production for an entire facility; and
performing the control action based on the determination that the downtime event will result in a stall production for the entire facility.

16. The computing system of claim 13, wherein determining the predictive impact probability comprises:

determining a downtime event has occurred at a first processing station;

determining that the downtime event has a 0% impact probability of a stall of production for an entire facility; and performing no control action based on the determination that the predictive impact probability is 0%.

17. The computing system of claim 13, wherein the control action comprises transmitting data which causes information to be provided for display via a Graphical User Interface (GUI), wherein data comprises a forecast of a workflow of the production facility.

18. The computing system of claim 17, wherein the forecast of the workflow of the production facility comprises predicted fill levels for the one or more processing stations.

19. The computing system of claim 13, wherein a forecast of a workflow of the production facility comprises a totem chart, wherein the totem chart comprises data indicative of the one or more processing stations in a processing order of the production facility, wherein the processing order is indicative of the processing order in which a unit arrives and departs from the respective processing stations of the one or more processing stations to move through the production facility.

20. One or more non-transitory computer readable media embodied in a computer-readable storage device and comprising instructions that, when executed by a processor, cause the processor to perform operations, the operations comprising:

receiving, by a computing system comprising one or more processors, data indicative of a current production environment, wherein the data indicative of the current production environment comprises (i) data from a sensor indicative of time since last unit from an upstream processing station and (ii) a fill level at one or more downstream processing stations in a production facility;

determining, by the computing system, a predictive impact probability indicative of a likelihood that a current downtime event at a first processing station will cause a future downtime event at a second processing station, wherein the predictive impact probability of the current downtime event is based at least in part on the data indicative of the current production environment; and in response to determining the predictive impact probability of the current downtime event, performing, by the computing system, a control action associated with the production facility.

\* \* \* \* \*